Figure 3:
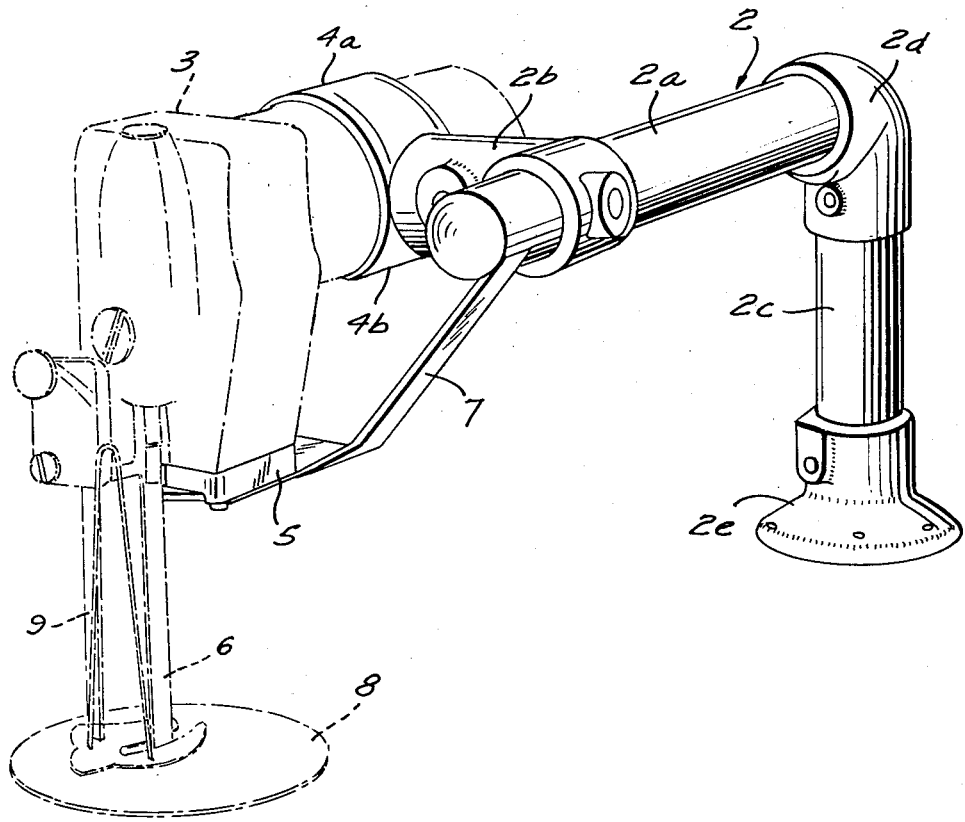

March 5, 1957 B. DARGOLS 2,783,841
SUPPORT FOR CUTTING MACHINES
Filed April 30, 1952 2 Sheets-Sheet 1
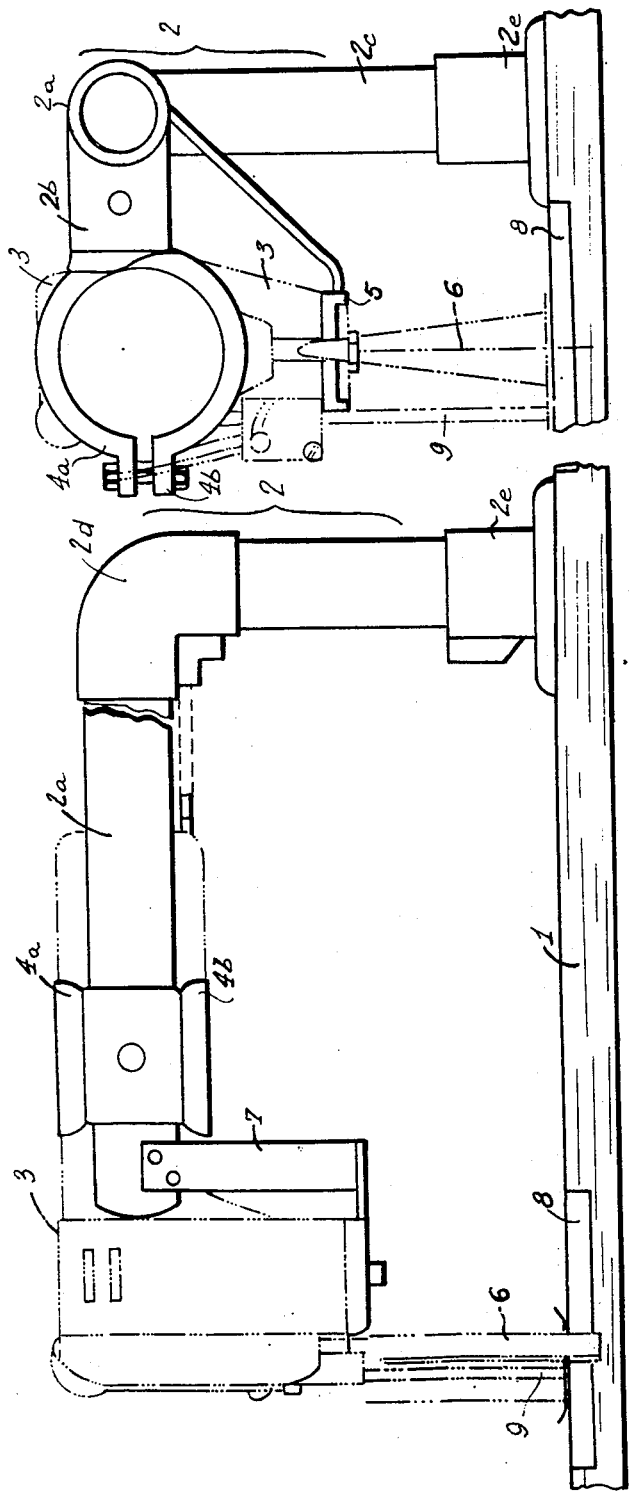
INVENTOR:
BERNARD DARGOLS
BY:

March 5, 1957  B. DARGOLS  2,783,841
SUPPORT FOR CUTTING MACHINES
Filed April 30, 1952  2 Sheets-Sheet 2

INVENTOR.
BERNARD DARGOLS
BY Michael S. Striker
Agt.

2,783,841

SUPPORT FOR CUTTING MACHINES

Bernard Dargols, Paris, France

Application April 30, 1952, Serial No. 285,253

Claims priority, application France April 11, 1952

4 Claims. (Cl. 164—47)

For certain industrial purposes and more particularly for the manufacture of wearing apparel, two kinds of cutting machines are in use: stationary machines and manually operated machines. In either case, the cutting tool is a band, a reciprocating or a circular knife.

With the first kind of machines, the cutting operation is effected by moving the pile of fabrics on the table in front of the cutting tool.

With the other types, on the contrary, it is the cutting machine itself that is moved by the operator in front of the pile resting upon a table, from which it is raised up by the counter-guide of the knife.

Generally spoken of, said two kinds of machines having different working principles are intended for different purposes and as a rule, the cutting workshops possess instruments belonging to both types.

This duality is very expensive especially for smaller workshops.

The object of this invention is to provide adjunctions to manually operated cutting machines so as to convert the latter temporarily into stationary machines, one single apparatus thus achieving the two operations hitherto done by two different machines.

The device according to the invention permitting a manually operated and portable machine for cutting fabrics or similar materials to be temporarily converted into a stationary machine wherein the pile of sheet material to be cut is displaced with respect to the cutter, is substantially remarkable by the fact that it comprises: a table, means supporting the machine while providing sufficient space around said cutter to let pass the fabric, means for fastening said machine to said supporting means, means for adjusting the magnitude of the angle formed by the cutter relatively to the table receiving the pile of material to be cut.

One embodiment of the present invention will be now described with reference to the accompanying drawings, wherein:

Fig. 1 is an elevational view of the machine;
Fig. 2 is a side view; and
Fig. 3 is a perspective view of the machine.

In all figures, the cutting machine is indicated in dotted lines, only the device according to the invention being shown in full lines.

A post 2 mounted on a table 1 has a horizontal arm 2a and an arm 2b extends laterally from arm 2a intermediate the ends of the latter. Arm 2b is provided with a means for the fastening of the manually operable cutting machine 3. The fastening may be effected by means of a collar in one or two pieces of which the jaws 4a and 4b embrace the body of the machine 3.

If said cutting machine 3 is to run correctly, it always must be placed in the same manner with respect to the post 2 and hence to the table 1 and furthermore, its cutter must operate perpendicularly to the table 1.

This result is obtained by the fact that the upper guide 5 of the knife 6, reciprocating vertically, is rigidly connected to the post by means of a tie or cross-piece 7.

Said tie or cross-piece which stiffens the assembly prevents the machine from revolving around its longitudinal axis and ensures any steadiness of position for the upper guide 5.

The lower guide of the knife, existing in the manually operable machine, is replaced by a guide 8 fitting in the table 1.

It is possible to provide the novel disposition with the usual finger-guard 9.

In order to facilitate the construction of the device, the post is built up with tubular members such as 2a, 2b, 2c, and with an L-joint 2d. The post 2c is secured to the table 1 by means of a socle 2e which is provided with a flange.

It will be clear that a device of this type allows a cutting machine to be run either by hand or as a stationary machine, thus conjugating both modes of utilization of one and the same machine.

Of course, any modification of the above described embodiments may be achieved within the scope of the present invention. Thus, the vertical part of the post may be suppressed and the arm or bracket may be fixed to a nearby wall. It is also possible to fix the post to the ceiling or to the floor.

Moreover, any other means may be chosen for temporarily fastening the machine to the end of the arm.

What I claim is:

1. A supporting device for a portable electric cutting machine having a cylindrical motor portion and a transverse knife guide portion, comprising, in combination, a supporting standard having a base portion at one end thereof adapted to be fixed relative to a supporting surface, and having a transverse arm at the other end thereof; clamping means on said transverse arm extending laterally therefrom and releasably embracing the cylindrical motor portion of the cutting machine for supporting the same above the supporting surface; and bracing means connected at one end to said transverse arm of said supporting standard and secured at its other end to the transverse knife guide portion of said electric cutting machine, so that the cutting machine may be supported by said clamping means and held against rotation therein by said bracing means.

2. A supporting device for a portable electric cutting machine having a cylindrical motor portion and a transverse knife guide portion, comprising, in combination, a supporting standard having a base portion at one end thereof adapted to be fixed relative to a supporting surface, and having a transverse arm at the other end thereof; clamping means on said transverse arm extending laterally therefrom and releasably embracing the cylindrical motor portion of the cutting machine for supporting the same above the supporting surface, said clamping means comprising a split collar member having means for drawing the spaced portions thereof together for providing a clamping force; and bracing means connected at one end to said transverse arm of said supporting standard and secured at its other end to the transverse knife guide portion of said electric cutting machine, so that the cutting machine may be supported by said clamping means and held against rotation therein by said bracing means.

3. A supporting device for a portable electric cutting machine having a cylindrical motor portion and a transverse knife guide portion, comprising, in combination, a supporting standard having a base portion at one end thereof adapted to be fixed relative to a supporting surface, and having a transverse arm at the other end thereof; clamping means on said transverse arm extending laterally therefrom and releasably embracing the cylindrical motor portion of the cutting machine for supporting the same above the supporting surface; and a brace bar connected at one end to said transverse arm of said supporting standard and secured at its other end to the transverse knife guide portion of said electric cutting machine, so that the cutting machine may be supported by said clamping means and held against rotation therein by said brace bar.

4. A supporting device for a portable electric cutting machine having a cylindrical motor portion and a transverse knife guide portion, comprising, in combination, a supporting standard having a base portion at one end thereof adapted to be fixed relative to a supporting surface, and having a transverse arm at the other end thereof; clamping means on said transverse arm extending laterally therefrom and releasably embracing the cylindrical motor portion of the cutting machine for supporting the same above the supporting surface, said clamping means comprising a split collar member having means for drawing the spaced portions thereof together for providing a clamping force; and a brace bar connected at one end to said transverse arm of said supporting standard and secured at its other end to the transverse knife guide portion of said electric cutting machine, so that the cutting machine may be supported by said clamping means and held against rotation therein by said brace bar.

References Cited in the file of this patent
UNITED STATES PATENTS

| | | |
|---|---|---|
| 399,847 | Dearing | Mar. 19, 1889 |
| 1,318,406 | Quinn | Oct. 14, 1919 |
| 1,332,051 | Malcolm | Feb. 24, 1920 |
| 1,528,536 | De Walt | Mar. 3, 1925 |
| 1,750,535 | McCollum | Mar. 11, 1930 |
| 1,789,571 | Wanamaker | Jan. 20, 1931 |
| 2,237,436 | Ille | Apr. 8, 1941 |
| 2,278,216 | Rich | Mar. 31, 1942 |
| 2,291,999 | Wilson | Aug. 4, 1942 |
| 2,462,317 | Green | Feb. 22, 1949 |
| 2,585,957 | Meeker | Feb. 19, 1952 |